(12) United States Patent
Roming et al.

(10) Patent No.: US 12,416,522 B2
(45) Date of Patent: Sep. 16, 2025

(54) METHOD AND DEVICE FOR CONFIGURING A LEVEL INDICATOR OR LEVEL METER

(71) Applicant: VEGA Grieshaber KG, Wolfach (DE)

(72) Inventors: Ansgar Roming, Aichhalden (DE); Reto Moser, Knonau (CH)

(73) Assignee: VEGA Grieshaber KG, Wolfach (DE)

( * ) Notice: Subject to any disclaimer, the term of this patent is extended or adjusted under 35 U.S.C. 154(b) by 17 days.

(21) Appl. No.: 17/863,073

(22) Filed: Jul. 12, 2022

(65) Prior Publication Data

US 2023/0057501 A1    Feb. 23, 2023

(30) Foreign Application Priority Data

Jul. 15, 2021    (EP) ..................................... 21185775

(51) Int. Cl.
*G01F 25/20*    (2022.01)

(52) U.S. Cl.
CPC ................... *G01F 25/20* (2022.01)

(58) Field of Classification Search
CPC .......... G01D 1/00; G01D 15/00; G01D 4/002; G01F 25/20; G01F 23/00; G01F 15/068;
(Continued)

(56) References Cited

U.S. PATENT DOCUMENTS 3,646,293 A * 2/1972 Howard .................. G01F 23/70
340/623
5,610,828 A * 3/1997 Kodosky ............. G06F 11/3664
716/139

(Continued)

FOREIGN PATENT DOCUMENTS

DE    10 2013 218 971 A1    3/2015
DE    102019129816 A1 *    5/2021
(Continued)

OTHER PUBLICATIONS

"Step by Step to the Right Sensor"; Product overview: Sensors for filling level, point level and pressure measurement as well as devices and software for integration into process control systems; May 7, 2021; XP002805000; URL: https://web.archive.org/web/20210507131724/; https://www.vega.com/de-de/produkte; 1 page.
(Continued)

*Primary Examiner* — Lisa M Caputo
*Assistant Examiner* — Eric Sebastian Von Wald
(74) *Attorney, Agent, or Firm* — Sterne, Kessler, Goldstein & Fox P.L.L.C.

(57) ABSTRACT

A computer-implemented method for configuring a level indicator or level meter is provided. A specification data set comprising at least one specification of the level indicator or level meter with respect to at least one user-defined requirement for the level indicator or level meter, at least one attribute of the level indicator or level meter and/or at least one area of use intended for the level indicator or level meter is provided at a data processing device. The data processing device analyzes the at least one specification of the level indicator or level meter contained in the specification data set while generating a configuration data set for configuring the level indicator or level meter. The level meter such that the level indicator or level meter can be graphically represented and/or produced based on the configuration data set.

19 Claims, 3 Drawing Sheets (58) Field of Classification Search
CPC .............. G01B 21/047; G05B 19/0426; G05B 2219/23298; G05B 2219/31104; G05B 19/41865; G05B 2219/35034; G05B 2219/37193; G05B 2219/25428; G06F 11/3604; G06F 30/20; G06F 9/44505; G06Q 30/0621; Y04S 20/30; Y10T 137/7306

See application file for complete search history.

(56) References Cited

U.S. PATENT DOCUMENTS

| | | | | |
|---|---|---|---|---|
| 8,037,753 | B2* | 10/2011 | Fehrenbach | G01D 21/02 |
| | | | | 73/299 |
| 8,086,664 | B2* | 12/2011 | Lo | G05B 19/056 |
| | | | | 703/22 |
| 9,815,683 | B1* | 11/2017 | Kalala | B67D 7/3218 |
| 11,307,551 | B1* | 4/2022 | Yasunami | G05B 19/0426 |
| 2014/0033554 | A1* | 2/2014 | Nahum | G01B 3/24 |
| | | | | 33/784 |
| 2014/0282227 | A1* | 9/2014 | Nixon | G06F 9/44505 |
| | | | | 715/786 |
| 2015/0088436 | A1 | 3/2015 | Schaetzle et al. | |
| 2015/0193972 | A1* | 7/2015 | Algreatly | G06T 3/60 |
| | | | | 345/420 |
| 2018/0174067 | A1* | 6/2018 | Spiro | G06N 20/00 |
| 2018/0202890 | A1* | 7/2018 | Mutch | G01M 3/28 |
| 2019/0056258 | A1* | 2/2019 | Gelada Camps | G01F 23/2928 |
| 2020/0003602 | A1* | 1/2020 | Gurumohan | G01F 23/28 |
| 2020/0012249 | A1* | 1/2020 | Altendorf | H04W 12/06 |
| 2021/0318281 | A1* | 10/2021 | Kraemer | G01F 23/804 |
| 2022/0222087 | A1* | 7/2022 | Goetz | G16H 40/60 |

FOREIGN PATENT DOCUMENTS

| | | | | |
|---|---|---|---|---|
| EP | | 2 851 757 A2 | 3/2015 | |
| WO | WO-2012028414 A1 | * | 3/2012 | ....... G05B 19/41865 |

OTHER PUBLICATIONS

Krohne Group; "Level Measurement"; Transmitters, switches, indicators and accessories for level measurement; Feb. 25, 2021; XP002805002A; URL: https://web.archive.org/web/20210225130932/; https://krohne.com/en/products/level•measurement/; 3 pages.

Emerson; "Products—Continuous Level Measurement"; Apr. 19, 2021; XP2805001A; URL: https://web.archive.org/web/2021041919 3328/; https://www.emerson.com/en-us/catalog /continuous-level-measurement; 5 pages.

* cited by examiner

METHOD AND DEVICE FOR CONFIGURING A LEVEL INDICATOR OR LEVEL METER

CROSS-REFERENCE TO RELATED APPLICATION

This application claims priority to European Patent Application No. 21 185 775.0 filed on Jul. 15, 2021, the entire content of which is incorporated herein by reference.

TECHNICAL FIELD

The invention relates generally to the field of level measurement. More particularly, the invention relates to a computer-implemented method and data processing device for configuring a measuring device, in particular a level indicator or level meter. Further, the invention relates to a level indicator or level meter configured and/or manufactured by the method, the use of the data processing device for configuring a level indicator or level meter, a program element for performing the method, and a computer-readable medium comprising such program element.

TECHNICAL BACKGROUND

In automation technology, field devices or measuring devices with sensors, such as level sensors or level indicators or level meters, are used in or on a large number of different containers with different geometries and in a large number of different plants with different processes. Level indicators or level meters are often used to determine the level and/or limit level of a medium in a container.

The containers used in the respective process plants, quantities or types of media contained therein, the composition of a medium, quantities of medium to be processed, and the process conditions for processing one or more media in a container, such as a temperature and/or a pressure, are usually adapted to individual requirements of the respective process.

Due to the different processes, the associated different requirements and the different areas of application of level indicators or level meters in process automation, level indicators or level meters are often specially adapted to the respective process. This may, for example, require adaptation and/or configuration of the level indicator or level meter in terms of functional scope, function, functionality, geometry, and/or structure. The actual adaptation and configuration of level indicators or level meters, in particular in the context of a quotation or an order by a user and a corresponding production of the level indicator or level meter, can be labor-intensive and thus cost-intensive.

SUMMARY

With embodiments of the disclosure, an improved computer-implemented method as well as a corresponding data processing device for configuring a level indicator or level meter can be provided in an advantageous manner. In particular, a manufacturing of the level indicator or level meter can be optimized thereby.

This may be achieved by the subject matter of the independent patent claims. Further embodiments of the disclosure are provided by the dependent claims and the following description.

A first aspect of the present disclosure relates to a computer-implemented method for configuring a level indicator or level meter. In this regard, the level indicator or level meter may be configured to determine and/or display a level and/or limit level of a medium, in particular a medium in a container. A level indicator device can, for example, be operatively and/or communicatively couplable to a further device, whereby the level indicator device itself can determine the level or can receive corresponding data from the further device for indicating the level. The level indicating device or level meter may thus denote a level limit measuring device. The method comprises the following steps:

providing, receiving and/or processing, at a data processing device, a specification data set comprising at least one specification of the level indicator or level meter with respect to at least one user-defined requirement for the level indicator or level meter, at least one attribute of the level indicator or level meter and/or at least one area of use intended for the level indicator or level meter;

analyzing and/or processing, with the data processing device, the at least one specification of the level indicator or level meter contained in the specification data set by generating, calculating, determining and/or creating a configuration data set for configuring the level indicator or level meter, wherein the configuration data set defines a geometry, shape, structure and/or function of the level indicator or level meter such that the level indicator or level meter is graphically representable and/or manufacturable based on the configuration data set.

The configuration data set can be generated by the data processing device on the basis of one or more specifications, which can, for example, correspond to one or more requirements for the configuration of the level indicator or level meter. The configuration data set may thereby contain all information relevant for a graphical representation and/or manufacturing of the level indicator or level meter. In particular, the configuration data set can completely define the level indicator or level meter with respect to its geometry, shape, structure and/or function, that the level indicator or level meter can be finished, produced, assembled, created, generated, and/or manufactured based on the configuration data set. The generation of the configuration data set can be done for example by analyzing the specification data set and/or by one or more calculations based on the specification data set.

For example, the specification data set may define one or more specifications of the level indicator or level meter, and the data processing device may determine the configuration data set based thereon, which may take into account and/or reflect the at least one specification of the level indicator or level meter. In particular, the configuration data set may define the geometry, shape, structure and/or function of the level indicator or level meter such that the at least one specification of the specification data set is met and/or can be met by the level indicator or level meter. The configuration data set may contain one or more data elements defining the geometry, shape, structure, and/or function of the level indicator or level meter.

According to the present disclosure, the geometry, shape, and/or structure of the level indicator or level meter may include, for example, a dimension of the level indicator or level meter (and/or at least one component of the level indicator or level meter), a size of the level indicator or level meter (and/or at least one component of the level indicator or level meter), an indication of one or more components of the level indicator or level meter, a number of one or more components of the level indicator or level meter, or the like. Alternatively or additionally, "the function" of the level indicator or level meter according to the present disclosure may comprise a functional scope of the level indicator or level meter and/or one or more functionalities provided by the level indicator or level meter.

The method according to the disclosure can in particular simplify and/or accelerate a quotation, a production, an order, an ordering process and/or a manufacturing of the level indicator or level meter, in particular since a labor- and time-intensive determination of the geometry, shape, structure and/or function of the level indicator or level meter by personnel can be omitted. This may further enable cost-effective manufacturing and configuration of the level indicator or level meter. The present disclosure may in particular be advantageously used for manufacturing and/or configuring various measuring devices and/or field devices, such as level indicating devices and/or level meters, pressure measuring devices, flow measuring devices, or the like. Thus, the present disclosure applies equally to field devices in general.

The data processing device may generally be a logic unit for data processing. The data processing device may thereby comprise one or more processors for data processing. For example, the data processing device may comprise one or more computers, for example one or more standalone computers or at least one server. Alternatively or additionally, the data processing device may also denote a mobile terminal, for example a PC, a notebook, a tablet, a smartphone, or the like.

The specification data set may generally be a data set comprising at least one specification of a level indicator or level meter, for example, by specifying one or more features, particularities, and/or characteristics. The specification data set may also be referred to as a basic data input data set. The specification data set may be used, for example, by a user to define, describe, and/or specify a desired or required level indicator or level measurement device. The specification data set may have a user-defined, predetermined, predefined requirement for the level indicator or level meter, an attribute of the level indicator or level meter, and/or a range of use intended for the level indicator or level meter. For example, the range of use may be an indication or definition of a process intended for the level indicator or level meter and/or an indication of one or more process conditions. For example, in this context, the specification data set may include a deployment temperature for the level indicator or level meter, a temperature for the process, a process pressure, a geographic location of the deployment site, a specific deployment container, a mounting geometry for mounting the level indicator or level meter in or on a container, and/or a medium to be measured.

The configuration data set can be seen as the result of analyzing the specification data set. It should be noted that the configuration data set may differ from the specification data set, e.g. in terms of data format and/or information content. In general, the configuration data set may be a data set which may be used for actual configuration and/or manufacturing of the level indicator or level meter. For example, the configuration data set may include design information for manufacturing the physical level indicator or level meter. Further, the configuration data set may comprise configuration data, which may be set up to configure, for example, a measurement unit of the level indicator or level meter. Alternatively or additionally, the configuration data set may comprise configuration data for specifying a type, size, number, design, and/or configuration of one or more antennas and/or other components of the level indicator or level meter, such as magnetic switches. The configuration data set may be determined, calculated, and/or determined at least in part based on specification data set, in particular determined, calculated and/or determined by means of the data processing device, and/or derived therefrom.

The term "graphically representable" is to be understood broadly in the context of the present disclosure. It may be a drawing, a sectional view of the level indicator or level meter, and/or an overview of the geometric dimensions of the level indicator or level meter.

By means of the method according to the disclosure, for example, the generation of a graphical representation of the level indicator or level meter, such as a CAD drawing, can be performed by a user by means of a few interactions within a short period of time, in particular without further skilled resources.

According to an embodiment, the method further comprises generating, with the data processing device based on the configuration data set, a graphical representation, in particular a 3D representation, of the level indicator or level meter for output to a user interface.

The user interface can be a monitor, a mobile device, a display, or the like. It is conceivable, especially with a 3D display position of the level indicator or level meter, that different perspectives, sections, and/or areas of the level indicator or level meter can be graphically displayed in detail. Via the output to a user interface, a user can visually inspect the level indicator or level meter that meets, for example, the user-defined requirement, and possibly verify that the graphical representation of the level indicator or level meter meets the user's expectations, requirements, and/or prerequisites. Thus, for example, the user may use the graphical representation of the level indicator or level meter to verify whether the user would like and/or should customize and/or complete the specification data set.

It is also conceivable that the dimensions, measurements and/or technical dimensions of the level indicator or level meter can be read and/or displayed in the graphic representation of the level indicator or level meter.

According to an embodiment, the method further comprises driving, with the data processing device, a user interface to output a user interface having at least one user adjustable control element. In other words, the data processing device may be arranged to drive a user interface such that a user interface is output and/or displayed at the user interface. By outputting the user interface and displaying the at least one control element, the user may be provided with the ability to input, modify, and/or customize the specification data set and/or the at least one specification.

The user interface may, for example, be a graphical user interface (GUI), such as an input window at the user interface. The user may, for example, set, vary, adjust, and/or modify one or more specifications of the level indicator or level meter via one or more user interface controls. The data processing device may convert and/or transform the at least one specification into a specification data set. Further, the data processing device may determine the configuration data set and optionally graphically display and/or visualize the level indicator or level meter determined according to the configuration data set in the user interface at the user interface. Thus, a modification of one of the control elements can also be graphically displayed to the user. This may enable intuitive and full configuration of the level indicator or level meter. Alternatively or additionally, at least part of the configuration data set may be displayed and/or output at the user interface, for example to provide the user with further information regarding the configuration. Optionally, an error message, warning and/or message may also be output, for example when a misconfiguration is determined by the data processing device, such as due to conflicting specifications of the level indicator or level meter and/or due to a standard or rule not being followed.

The at least one specification of the level indicator or level meter is determinable based on an adaptation of the at least one control element by the user. Alternatively or additionally, the specification data set with the at least one specification of the level indicator or level meter is created at least partly based on a user input via the at least one control element. In this regard, the specification data set may be created by an external data processing device, such as a computer, a mobile device, or the like, and transmitted to the data processing device. For example, the data processing device may receive the specification data set from the external data processing device via a communication interface. Alternatively, the data processing device itself may determine, calculate, and/or determine the specification data set based on the user input.

Thus, providing the specification data set to may comprise, for example, providing the specification data set to a data storage of the data processing device, and/or providing the specification data set to one or more processors of the data processing device. Alternatively or additionally, providing the specification data set may comprise transmitting and/or receiving the specification data set via a communication interface of the data processing device.

According to an embodiment, the user interface is controlled via a web interface for displaying the user interface by the data processing device. Alternatively or additionally, the user interface is provided to the user interface via a web interface. Thus, at least one server can serve as a data processing device and any number of users can carry out the configuration of one or more level indicators or level meters via corresponding web interfaces, in particular simultaneously.

In other words, the user can, for example, obtain a graphical representation of the level indicator or level meter via the Internet and perform a configuration. It is also conceivable that a user can thus retrieve at different workstations the graphical representation of the level indicator or level meter, which may have been generated based on the configuration data set. For example, corresponding user accounts can be provided on the data processing device for this purpose.

According to an embodiment, providing the specification data set comprises the following:

receiving and/or processing user input via at least one control element provided at a user interface by the data processing device; and generating the configuration data set and/or the specification data set based at least in part on user input.

For example, a user may provide user input by operating, adjusting, controlling, and/or modifying the control element, which the data processing device may take into account in the specification record and/or the configuration record.

For example, the data processing device may be configured to adjust, change, and/or modify the configuration data set and/or a graphical representation of the level indicator or level meter in response to user input.

According to an embodiment, the at least one control element is a graphical control element. For example, the operating element can be adapted to a user interface by the user via an input device, such as a mouse, a touch pad, and/or a keyboard. This can enable intuitive, fast, efficient, and comprehensive configuration of the level indicator or level meter.

According to an embodiment, the at least one control element comprises a slide control, a graphically operable control element, a drop-down menu, a selection control and/or a rotary control. However, any other control elements and filter elements are also conceivable.

Thus, for example, a user can adjust and/or specify a process temperature and/or a process pressure by sliding a slider. Similarly, it is conceivable that a user can select an option for a specification of the level indicator or level meter from a selection of options via a drop-down menu. Alternatively or additionally, for example, a flange size, a flange diameter, the length of a bypass tube, an angle of attack of the level indicator or level meter, or any other parameters can be specified by one or more controls, as explained below, among others.

According to an embodiment, the specification data set comprises at least one element selected from the following group:

a process temperature, a process temperature range, a diameter of a process connection of the level indicator or level meter, a process pressure, a process pressure range, a strength of one or more connection areas of the level indicator or level meter, a diameter of one or more connection tubes of the level indicator or level meter, a diameter of a bypass tube of the level indicator or level meter, a wall thickness of one or more connection areas of the level indicator or level meter, a number of process connections of the level indicator or level meter, a number of cross connections of the level indicator or level meter for connecting a bypass tube of the level indicator or level meter to a wall, a distance between two cross connections of the level indicator or level meter for connecting a bypass tube of the level indicator or level meter to a wall; and/or a number of magnetic switches of the level indicator or level meter.

It should be noted that the specification data set may include further specifications, features, and/or characteristics of the level indicator or level meter. It should also be noted that a process connection of the level indicator or level meter may also be referred to as a connection spigot and a mounting spigot.

One or more of the aforementioned specifications can be defined by a user, for example, by operating one or more controls on the user interface. The data processing device can then create the specification data set based on the defined specifications and calculate the configuration data set.

According to an embodiment, the step of generating the configuration data set comprises determining, calculating and/or determining, by the data processing device, one or more geometric parameters of the level indicator or level meter for specifying and/or defining a geometry of the level indicator or level meter. Alternatively or additionally, the step of generating the configuration data set comprises deriving, from the specification data set by the data processing device, one or more geometric parameters of the level indicator or level meter for specifying a geometry of the level indicator or level meter.

According to an embodiment, the at least one geometric parameter of the level indicator or level meter comprises a length of a bypass tube of the level indicator or level meter, a diameter of a bypass tube of the level indicator or level meter, a diameter of a process connection, a position of a process connection of the level indicator or level meter, a diameter of a cross connection, a wall thickness of one or more connection areas of the level indicator or level meter, a strength of one or more connection areas of the level indicator or level meter, a geometry of one or more connection ports of the level indicator or level meter, a geometry of one or more connection areas of the level indicator or level meter, a strength of one or more connection areas of the level indicator or level meter, a geometry of one or more process connections of the level indicator or level meter, a number of process connections of the level indicator or level meter, a number of cross connections of the level indicator or level meter for connecting a bypass tube of the level indicator or level meter to a wall, in particular a wall of a container and/or a measuring system, a distance between two cross connections of the level indicator or level meter for connecting a bypass tube of the level indicator or level meter to a wall, a position of one or more process connections of the level indicator or level meter, and/or a number of magnetic switches of the level indicator or level meter.

According to an embodiment, the configuration data set is generated based on the at least one specification of the level indicator or level meter included in the specification data set and based on at least one predetermined reference value associated with the at least one specification. In other words, a predetermined reference value may be considered when generating the configuration data set. For example, if data such as a geometry, shape, a structure and/or a function of the level indicator or level meter is determined and/or calculated during generation of the configuration data set and deviates in an unfavorable manner from the reference value, such deviation may lead to, for example, adjusting the determined data and/or sending a message to the user. By means of the at least one reference value, for example, legal requirements, rules, standards or regulations can be taken into account. Alternatively or additionally, an empirical reference value can be used to check a specification and to determine the configuration data set.

According to an embodiment, the at least one reference value comprises a limiting pressure for one or more connection areas of the level indicator or level meter, a limiting pressure for one or more connection nozzles/fixing nozzles of the level indicator or level meter, a limiting pressure for one or more cross connections of the level indicator or level meter for connecting a bypass tube of the level indicator or level meter to a container level indicator or level meter, a minimum distance between two adjacent cross-connections of the level indicator or level meter for connecting a bypass tube of the level indicator or level meter to a container, a minimum wall thickness of a connection area (or connection/fixing socket) of the level indicator or level meter and/or a minimum strength of a connection area (or connection/fixing socket) of the level indicator or level meter.

The term "reference value" is to be understood broadly in the context of the present disclosure. It may be a preset value, a limit value and/or default value.

The at least one reference value can, for example, be stored in the data processing device and/or in a memory provided for this purpose. Alternatively or additionally, the at least one reference value can be retrieved by the data processing device from an external memory. The reference value may optionally be stored independently of a user, such that a user cannot, for example, change the reference value. However, it is conceivable that the reference value can likewise be entered and/or stored by a user, for example by a user with corresponding user approval.

According to an embodiment, the level indicator or level meter has two or more cross-connections for connecting a bypass tube of the level indicator or level meter to a wall, in particular a wall of a container. In addition, the step of generating the configuration data set comprises calculating a distance between two or more cross-connections of the level indicator or level meter.

The transverse connection may be a horizontal-vertical connection for mechanically and/or fluidly coupling the bypass tube to a vessel. For example, the cross connection can be arranged perpendicular to the main axis, or longitudinal axis, of the bypass tube of the level indicator or level meter.

For example, it may prove advantageous to calculate the distance between two or more transverse connections, in particular transverse connections directly adjacent in the longitudinal direction of the bypass tube, for example to enable improved force distribution and/or pressure distribution along the bypass tube and/or at the connection areas.

According to an embodiment, the step of generating the configuration data set comprises calculating a geometry of at least one cross-connection, at least one connection area, and/or at least one process connection of the level indicator or level meter. Thereby, a mechanical stability of the cross-connections can be ensured.

Generating the configuration data set may comprise, for example, calculating a wall thickness or wall thickness of a cross connection, a connection area and/or a process connection of the level indicator or level meter. Said step may also comprise selecting a material for a part and/or element of the level indicator or level meter.

According to an embodiment, the method further comprises the following steps:
  determining, based on the specification data set, a plurality of configuration options for the level indicator or level meter; and
  selecting one of the determined configuration options, wherein the configuration data set is generated based on the selected configuration option for the level indicator or level meter.

For example, the data processing device may determine multiple configuration possibilities based on the specification data set, and based on a selection rule, for example, select one of the possibilities and create the configuration data set. Alternatively, one of the configuration possibilities may be selected via user input by the user.

According to an embodiment, the method further comprises configuring the level indicator or level meter by means of the configuration data set. This may include, for example, defining and/or determining a parameterization of the level indicator or level meter.

It is conceivable that, for example, a virtual twin of the level indicator or level meter is created and/or generated based on the configuration data set. Thus, a virtual twin of the level indicator or level meter can be configured by means of the configuration data set. Using the virtual twin of the level indicator or level meter, the manufacturing, fabrication and/or configuration of the actual level indicator or level meter can be simplified.

According to an embodiment, the method further comprises checking whether the at least one specification of the level indicator or level meter contained in the specification data set is satisfied by the geometry, structure and/or function of the level indicator or level meter defined in the configuration data set. In other words, the data processing device can verify that analyzing the specification data set to generate a configuration data set has been performed such that the configuration data set contains and/or reflects the at least one specification.

According to an embodiment, the method further comprises sending and/or providing an error message based on analyzing the specification data set. The error message may be provided and/or output to a user, for example, at a user interface and/or at a user interface. The error message may alert a user to a missing and/or incorrect specification of the level indicator or level meter in the specification data set and/or to a misconfiguration in the configuration data set. For example, the data processing device may check whether two specifications indicated in the specification data set and/or two configurations indicated in the configuration data set conflict with each other.

The data processing device may not have all the data necessary to calculate, determine, and/or establish a geometry, a shape, a structure, a function, a feature, a measurement, a characteristic. Thus, the data processing device and/or another entity, such as a user interface or terminal, may send a message that may request the user to provide a further specification of the level indicator or level meter to the data processing device and/or adjust an already provided specification of the level indicator or level meter. The message can be a visual and/or an acoustic message.

Alternatively or additionally, a message can be sent which indicates that several configuration data sets have been generated based on the existing specification data set, where each configuration data set can enable a different configuration option of the level indicator or level meter. The user may thus be prompted, for example, to select a configuration and/or a configuration data set.

According to an embodiment, the method further comprises creating, based on the configuration data set, a CAD specification of the level indicator or level meter for manufacturing the level indicator or level meter. For example, a computer aided design (CAD) file may be created and/or output by the data processing device. Based on the CAD specification, the level indicator device or level meter may be manufactured and/or fabricated. Thus, a configuration of a level indicator or level meter made by the user can be used immediately to manufacture the level indicator or level meter, especially without requiring skilled resources to create the CAD specification. This can result in significant personnel and cost savings in the manufacturing process.

The CAD specification may include any necessary key data, dimensions, and/or characteristics of the level indicator or level meter that may be required to manufacture the level indicator or level meter and/or to plan the insertion of the level indicator or level meter.

Another aspect of the present disclosure relates to a level indicator or level meter configured, parameterized, manufactured, and/or produced by means of a data processing device according to the method as described above and below. It should be noted that the level indicator or level meter may be configured by means of the data processing device before and/or after its first use according to the method as described above and below.

Another aspect of the present disclosure relates to a data processing device for configuring a level indicator or level meter, the data processing device being adapted to perform steps of the method as described above and below. The data processing device may also be considered as a server, a computing unit, an analyzer, and/or an application. In particular, the data processing device may be for configuring and/or manufacturing a level indicator or level meter.

Another aspect of the present disclosure relates to a program element, which, when executed on a data processing device, directs the data processing device to perform steps of the method as described above and below.

Another aspect of the present disclosure relates to a computer-readable medium having thereon a program element which, when executed on a data processing device, instructs the data processing device to perform steps of the method as described above and below.

Another aspect of the present disclosure relates to the use of a data processing device, as described above, for configuring a level indicator or level meter.

In the following, embodiments of the present disclosure are described with reference to the figures. If the same reference signs are used in the following description of figures, these designate the same or similar elements. The illustrations in the figures are schematic and not to scale.

DETAILED DESCRIPTION

Figure 1:
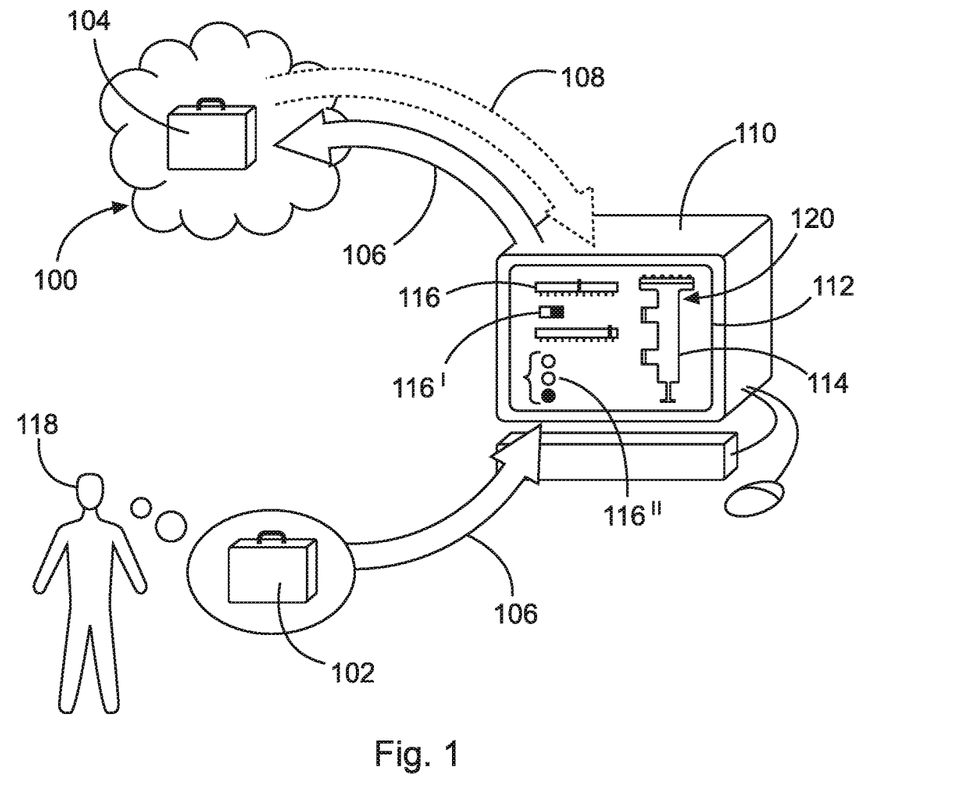
FIG. 1 shows a data processing device according to an embodiment.

FIG. 1 shows a data processing device 100 according to an embodiment. The data processing device 100 of FIG. 1 is shown as a server, but may also be implemented or stored as a computing unit in a computer. The data processing device 100 can receive a specification data set 102, in particular receive it directly, or create it based on an input of a user 118 by means of a user interface 110.

The specification data set 102 has at least one specification of a level indicator or level meter 114 that the user 118 wishes to configure. In other words, a user 118 may provide a specification data set 102 to the data processing device directly or via a user interface 110. It is equally conceivable that the data processing device itself creates a specification data set 102.

The data processing device 100 may analyze the specification data set 102. Analyzing the specification data set 102 includes generating 108 a configuration data set 104. The configuration data set 104 may further be used to provide a graphical representation 120 of the level indicator or level meter 114 such that it may be output to a user interface 110.

It should be noted that both the specification data set 102 and the configuration data set 104 are shown only schematically with reference to FIG. 1. The specification data set 102 may include specifications of the level indicator or level meter 114 with respect to, for example, a user-defined requirement for the level indicator or level meter 114, an attribute of the level indicator or level meter 114, and/or a range of use intended for the level indicator or level meter 114. For example, the user 118 may define or specify, via one or more user inputs, what the level indicator or level meter is to be used for and how it is to be used and/or what requirements it is to meet. In this regard, a specification of the level indicating device or level meter 114 may be a feature and/or technical characteristic of the level indicating device or level meter. The specifications may correspond to a user's desire or vision for the level indicator or level meter, and thus may allow for custom configuration of the level indicator or level meter according to user specifications.

The configuration data set 104, which may be generated by the data processing device based on the received specification data set, generally includes a geometry, structure, and/or function of the level indicator or level meter 114. The configuration data set 104 may generally include data and/or features necessary to configure the level indicator or level meter 114. Thus, the level indicator or level meter 114 may be graphically representable, configurable, and/or ready based on the configuration data set 104.

For example, a user 118 may specify one or more specifications for the level indicator or level measurement device through an adjustable control element 116 at a user interface 112. The data processing device 100 may process corresponding user input and determine the specification data set and/or the configuration data set. In other words, the user may input or customize the specification data set 102 and/or a specification of the specification data set 102 by customizing one or more control elements 116. The user 118 may thus provide user input via one or more control elements 116, such that the specification data set 102 may be created based in part on such user input. A plurality of control elements 116 may be present in various forms on the user interface. For example, a control element 116 may be a slide control element 116, a graphically operable control element 116', a drop-down menu, a selection control, and/or a rotary control.

By means of a user interface 110 and its graphical user interface 112, a graphical representation of the level indicator or level meter 114 to be configured may be provided to a user 118. The graphical representation 120 of the level indicator or level meter is based on the configuration data set 104 and is created or generated by the data processing device 100. Such a graphical representation 120 may be, for example, a CAD drawing and/or a 3D representation of the level indicator or level meter 114. Conceivably, the user may read the generated configuration data set, which may have been derived, for example, from an analysis of the user-entered specification data set, at a graphical user interface 112. In addition, it is conceivable that the user 118 may wish to customize or modify the configuration data set 104 because, for example, the graphical representation 120 of the level indicator or level meter 114 does not yet accurately represent the desired level indicator or level meter 114.

The configuration data set 104 may likewise be understood for the time being as a suggestion to the user 118. The configuration data set 104 may include multiple configuration options for configuring the level indicator or level meter 114, between which the user 118 may select, for example, via the graphical user interface 112. After such selection of a configuration option, for example, the configuration data set 104 may comprise only the data set that meets the requirements for and/or satisfies the prerequisites for the level indicator or level meter 114.

Figure 2:
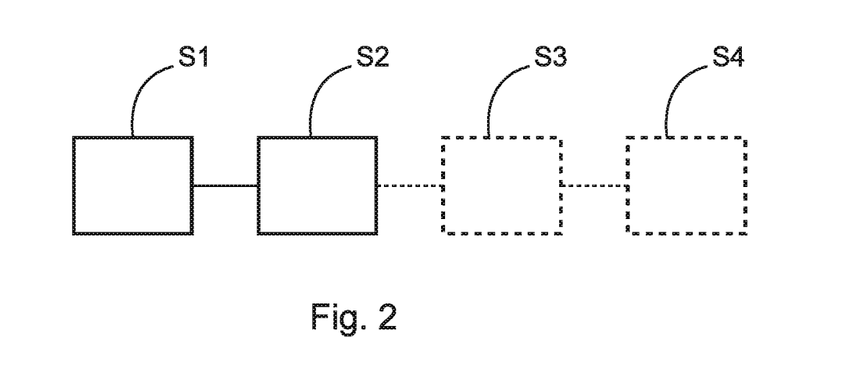
FIG. 2 shows a flow chart of a process according to an embodiment.

FIG. 2 shows a flowchart of a method according to an embodiment. In a first step S1, at a data processing device 100, a specification data set 102 is provided 106 comprising at least one specification of the level indicator or level meter 114 with respect to at least one user-defined requirement for the level indicator or level meter 114, at least one attribute of the level indicator or level meter 114, and/or at least one area of use intended for the level indicator or level meter 114.

In a further step S2, the data processing device 100 analyzes the at least one specification of the level indicator or level meter 114 included in the specification data set 102 while generating 108 a configuration data set 104 for configuring the level indicator or level meter 114, wherein the configuration data set 104 defines a geometry, structure, and/or function of the level indicator or level meter 114 such that the level indicator or level meter 114 is graphically representable and/or manufacturable based on the configuration data set 104.

In a further optional step S3, based on the configuration data set 104, the data processing device 100 generates a graphical representation 120, in particular a 3D representation, of the level indicator or level meter 114 for output to a user interface 110, such as a monitor, a cell phone, and/or a display.

In a further optional step S4, a user interface 110 for outputting a graphical user interface 112 having at least one control element 116 adjustable by a user 118 is provided by the data processing device 100. The user can make adjustments via the control element, which the data processing device can take into account by updating and/or adjusting the configuration data set accordingly, and optionally adjusting the graphical representation.

Thus, the specification of the level indicator or level meter 114 and/or the configuration data set may be determined based on an adjustment of one or more control elements 116 by the user 118. The specification data set 102 may further be created based, in part, on user input via a control element 116. In other words, the user 118 may provide the specification data set 102 to the data processing device 100 in various ways.

Figure 3:
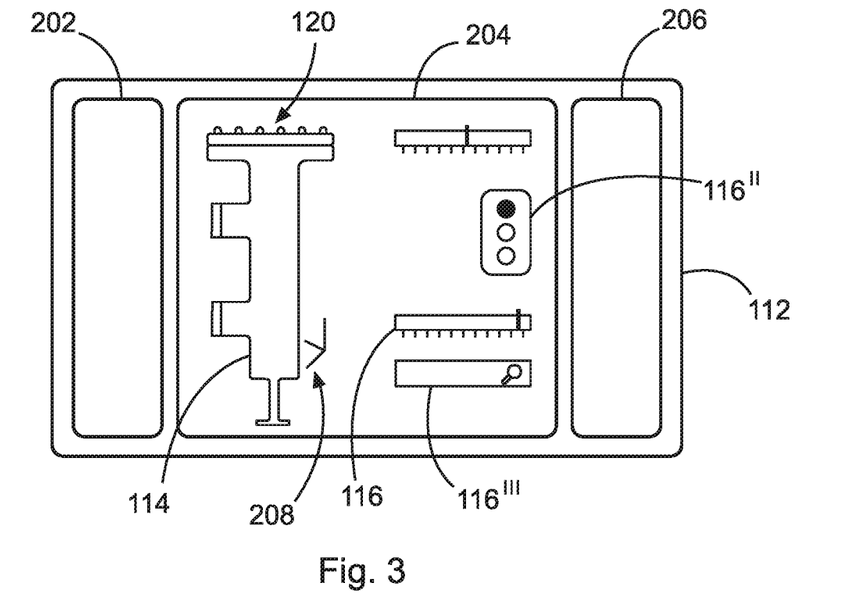
FIG. 3 shows a user interface provided by a data processing device according to an embodiment.

FIG. 3 illustrates a graphical user interface 112, for example, a graphical user interface 112 of a user interface 110, such as may be provided by a data processing device 100.

For example, the graphical user interface 112 may be divided into multiple areas, such as interactive and non-interactive areas. Such areas may also be referred to as a mask. It should be noted that the graphical user interface 112 of FIG. 3 may be a user interface as shown in FIG. 1.

In a first area, such as an input screen 202, the specification data set 102 may be shown and/or entered by the user so that the specification data set 102 may be provided to the data processing device 100. In another possible second area 204 of the graphical user interface 112, such as a product navigator area, a graphical representation 120 of the level indicator or level meter 114 may be displayed. The graphical representation 120 may be a 3D graphical representation 120, as indicated by the 3D axes 208. For example, the product navigator area 204 may display or overlay at least a portion of the configuration data set 104, which may have resulted from an analysis using the data processing device 100 (see FIG. 1).

The product navigator area 204 or other area may include adjustable control elements 116, 116', 116", 116"', allowing a user 118 to partially input or customize the specification data set 102. Adjustment of the specification data set 102 may occur both before and after analyzing with the data processing device 100 and generating a configuration data set 104. For example, it is conceivable that a configuration data set 104 may have already been generated based on the analyzed specification data set, and may be customized or modified based on one or more user inputs using a control element 116.

For example, it is conceivable that the number and/or type of control elements 116 may be adjusted or displayed based on the generated configuration data set 104. For example, after analyzing the specification data set 102, the configuration data set 104 may not include all of the information, data, features, and/or setting necessary 114 to configure the level indicator or level meter. It is possible that this may be because the specification data set 102 does not include all of the specification of the level indicator or level meter 114 necessary for this purpose. This can be made up for, so to speak, in that the missing specification of the level indicator or level meter 114 can be entered by a user 118 via the corresponding control element 116 displayed for this purpose.

The graphical user interface 112 may further include a third area 206. The third area may also be referred to as an output screen 206, for example. For example, the configuration data set 104 may be displayed and/or shown in the third area 206. Moreover, it is also conceivable that the third area 206 may serve to output a message, such as a visual message. Such a message may, for example, alert a user that further specification of the level indicator or level meter 114 may be required to achieve a comprehensive and/or customized configuration of the level indicator or level meter 114.

Figure 4:
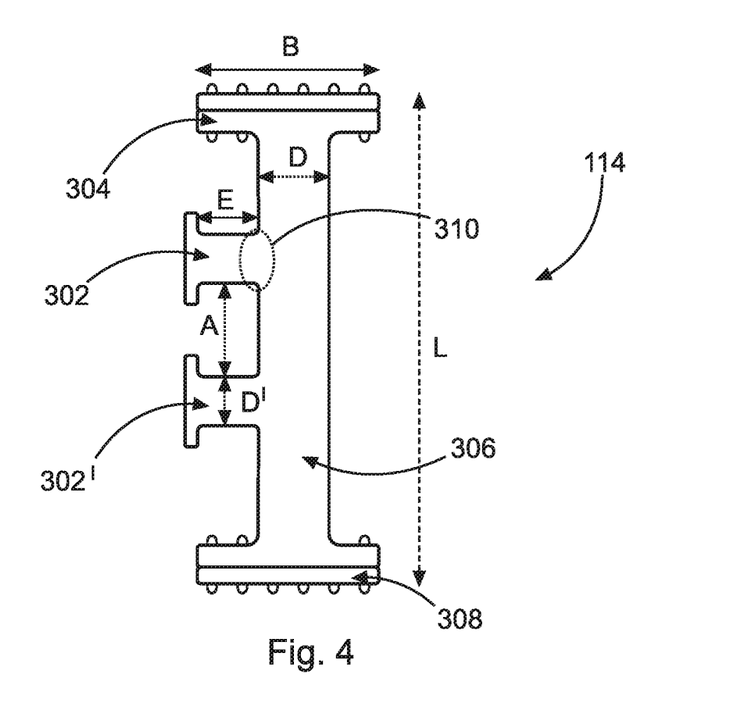
FIG. 4 shows a level indicator or level meter according to an embodiment.

FIG. 4 shows a level indicator or level meter 114 according to an embodiment. The level indicator or level meter 114 of FIG. 4 may be configured by means of a data processing device 100 (see FIG. 1) when performing a procedure, such as the procedure of the flowchart of FIG. 2.

The level indicator or level meter 114 of FIG. 4 has a bypass tube 306 with a diameter D, two cross connections 302, 302' each with a diameter D', two process connections 304, 308 with a diameter B. There may be a distance A between the two cross connections 302, 302'. The cross connections 302, 302' may serve to mechanically and/or fluidly connect the bypass tube 306 to a wall, such as a wall of a vessel.

In addition, the level indicator or level meter 114 includes a connection area 310, which may have a certain strength. For example, a certain wall thickness of the connection area 310 may be required to ensure safe use of the level indicator or level meter 114. Accordingly, the wall thickness and/or strength of the connection area 310 may be calculated by the data processing device 100 (see FIG. 1) based on the specification data set 102 comprising, for example, a deployment pressure.

For example, the configuration record 104 may include the length L of the bypass tube 306, the diameter of the process connections 304, 308, the distance E between the bypass tube 306 and a wall, the diameter D' of the cross connections 302, 302', the number of cross connections 302, 302', and/or the distance A between two adjacent cross connections 302, 302'. These dimensions and/or characteristics of the level indicator or level meter 114 may have been calculated, analyzed, and/or derived by the data processing device 100 (see FIG. 1) based on the specification data set. It is further conceivable that the data processing device 100 may further take into account a predetermined reference value when generating the configuration data set 104. The reference value may be related to a specification of the level indicator or level meter 114. For example, a maximum length L max of the level indicator or level meter 114 may be predetermined and may be stored or stored, for example, in the data processing device 100 or in an external memory. Alternatively or additionally, a minimum distance between two cross-connections, a maximum distance between two cross-connections, a reference diameter of a connection area, a reference strength of a connection area, a reference diameter of a flange or the like may be taken into account.

Figure 5:
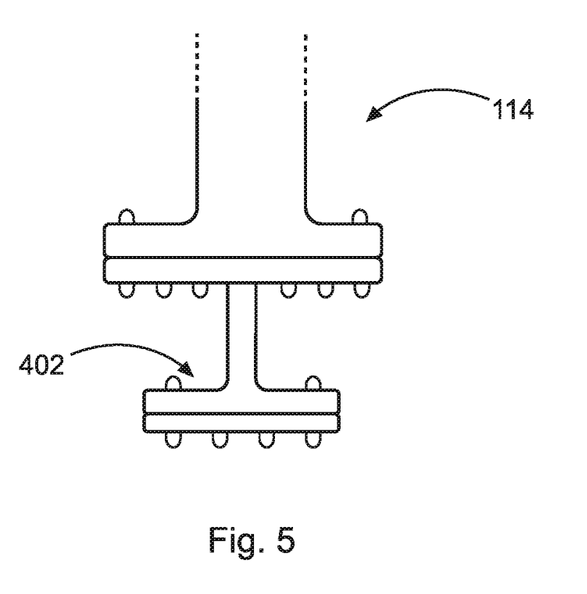
FIG. 5 shows a level indicator or level meter according to a further embodiment.

FIG. 5 shows a level indicator or level meter 114 according to an embodiment. Unless otherwise described, the level indicator or level meter 114 of FIG. 5 has the same features and elements as the level indicator or level meter 114 of FIG. 4.

In particular, FIG. 5 shows an example of a level indicator or level meter 114 configured by means of the data processing device 100 (see FIG. 1). For example, it is conceivable that it has been calculated from analyzing the specification data set 102 by means of the data processing device 100 that the level indicator or level meter 114 requires a further connection 402, such as a process connection, for the desired use, such as use desired by the user 118, of the level indicator or level meter 114. The data processing device 100 may indicate this to the user by outputting an appropriate message.

It should be noted that "comprising" and "comprising" do not exclude other elements or steps, and the indefinite articles "one" or "a" do not exclude a plurality. It should further be noted that features or steps that have been described with reference to any of the above embodiments may also be used in combination with other features or steps of other embodiments described above. Reference signs in the claims are not to be regarded as limitations.

What is claimed is:

1. A method for manufacturing a level indicator or level meter, the method comprising:
   receiving, via an adjustable control element at a user interface of a data processing device, a specification data set comprising a specification of the level indicator or level meter with respect to at least one of a user-defined requirement for the level indicator or level meter, an attribute of the level indicator or level meter, or an area of use intended for the level indicator or level meter;
   analyzing, with the data processing device, the specification of the level indicator or level meter;
   upon analyzing the specification data set, generating, with the data processing device, a configuration data set for configuring the level indicator or level meter, wherein the configuration data set is indicative of at least one of a geometry, shape, or structure of the level indicator or level meter to graphically produce the level indicator or level meter according to the configuration data set;
   generating, based on the configuration data set, a graphical representation of geometric dimensions of the level indicator or level meter for manufacturing the level indicator or level meter;
   displaying, at a display of the data processing device, the graphical representation; and
   manufacturing the level indicator or level meter using the configuration data set and the graphical representation.

2. The method of claim 1, wherein the graphical representation comprises a 3D representation of the level indicator or level meter and a sectional view of the level indicator or level meter.

3. The method according to claim 1, wherein the user interface is controlled by the data processing device via a web interface for displaying the graphical user interface, and wherein the graphical user interface is provided via a web interface at the user interface.

4. The method according to claim 1, wherein providing the specification data set comprises:
   receiving and processing user input via a control element provided at a graphical user interface by the data processing device; and
   generating the configuration data set based at least in part on the user input.

5. The method according to claim 1, wherein the control element is a graphical control element.

6. The method according to claim 1, wherein the control element comprises at least one of a slide control, a graphically operable control element, a drop-down menu, a selection control, or a rotary control.

7. The method according to claim 1, wherein the specification data set comprises an element selected from the group consisting of:
a process temperature, a process temperature range, a diameter of a process connection of the level indicator or level meter, a process pressure, a process pressure range, a strength of one or more connection ranges of the level indicator or level meter, a diameter of one or more connection tubes of the level indicator or level meter, a diameter of a bypass tube of the level indicator or level meter, a wall thickness of one or more connection areas of the level indicator or level meter, a number of process connections of the level indicator or level meter, a number of cross connections of the level indicator or level meter for connecting a bypass tube of the level indicator or level meter to a wall, a distance between two transverse connections of the level indicator or level meter for connecting a bypass tube of the level indicator or level meter to a wall; and
a number of magnetic switches of the level indicator or level meter.

8. The method according to claim 1, wherein the step of generating the configuration data set comprises determining, by the data processing device, a geometric parameter of the level indicator or level meter for specifying a geometry of the level indicator or level meter, and
wherein the step of generating the configuration data set comprises deriving, from the specification data set by the data processing device, the geometric parameter for specifying the geometry of the level indicator or level meter.

9. The method according to claim 8, wherein the geometric parameter comprises at least one of a length of a bypass tube of the level indicator or level meter, a diameter of the bypass tube of the level indicator or level meter, a diameter of a process connection of the level indicator or level meter, a position of the process connection, a diameter of a cross connection, a wall thickness of one or more connection areas of the level indicator or level meter, a strength of the one or more connection areas, a geometry of the one or more connection areas, a geometry of the one or more connection areas, a solidity of the one or more connection areas, a geometry of one or more process connections of the level indicator or level meter, a number of process connections of the level indicator or level meter, a number of cross connections of the level indicator or level meter for connecting a bypass tube of the level indicator or level meter to a wall, a distance between two transverse connections of the level indicator or level meter for connecting a bypass tube of the level indicator or level meter to a wall, a position of the one or more process connections, or a number of magnetic switches of the level indicator or level meter.

10. The method according to claim 1, wherein the configuration data set is generated based on the specification of the level indicator or level meter and based on a reference value associated with the specification.

11. The method according to claim 10, wherein the reference value is at least one of a limit pressure for one or more connection areas of the level indicator or level meter, a limit pressure for one or more process connections of the level indicator or level meter, a limit pressure for one or more cross connections of the level indicator or level meter for connecting a bypass tube of the level indicator or level meter to a wall, a minimum distance between two adjacent transverse connections of the level indicator or level meter for connecting a bypass tube of the level indicator or level meter to a wall, a minimum wall thickness of the one or more connection areas, or a minimum strength of the one or more connection areas.

12. The method according to claim 1, wherein the level indicator or level meter includes two or more cross-connections for connecting a bypass tube of the level indicator or level meter to a wall, and
wherein the step of generating the configuration data set comprises calculating a distance between two or more cross-connections of the level indicator or level meter.

13. The method according to claim 11, wherein the step of generating the configuration data set comprises calculating a geometry of at least one of a cross-connection, a port region, or a process port of the level indicator or level meter.

14. The method according to claim 1, further comprising:
determining, based on the specification data set, a plurality of configuration options for the level indicator or level meter; and
receiving a selection of one of the determined configuration options, wherein the configuration data set is generated based on the selected configuration option for the level indicator or level meter.

15. The method according to claim 1, further comprising:
configuring the level indicator or level meter using the configuration data set.

16. The method according to claim 1, further comprising:
verifying that the specification of the level indicator or level meter is satisfied by at least one of the geometry, structure, form, or function of the level indicator or level meter defined in the configuration data set.

17. The method according to claim 1, further comprising:
submitting and providing an error message based on analyzing the specification data set; and
wherein the error message alerts a user to at least one of a missing specification or an incorrect specification of the level indicator or level meter in the specification data set.

18. The method of claim 1, wherein the graphical representation comprises a CAD specification of the level indicator or level meter for manufacturing the level indicator or level meter.

19. The method of claim 1, further comprising:
generating configuration options within the configuration data set;
receiving, via a second adjustable control element at the user interface, a user selection of one of the configuration options;
updating, with the data processing device, the configuration data set and the graphical representation based on the selected configuration option; and
manufacturing the level indicator or level meter using the updated configuration data set and the updated graphical representation.

* * * * *